United States Patent
Salatrik et al.

[11] Patent Number: 6,109,760
[45] Date of Patent: Aug. 29, 2000

[54] ILLUMINATED POWER OUTLET

[75] Inventors: Ronald L. Salatrik, Davisburg; James A. Watson, Washington, both of Mich.

[73] Assignee: DaimlerChrysler Corporation, Auburn Hills, Mich.

[21] Appl. No.: 09/211,083

[22] Filed: Dec. 14, 1998

[51] Int. Cl.⁷ .................................................. F21V 33/00
[52] U.S. Cl. .................... 362/95; 362/555; 362/376; 362/378; 362/800; 216/200; 216/209; 216/260; 216/267; 216/269
[58] Field of Search ..................................... 362/489, 555, 362/95, 376, 378, 800; 219/260, 267, 269, 200, 209, 507–510, 520

[56] References Cited

U.S. PATENT DOCUMENTS

| | | | |
|---|---|---|---|
| 2,220,607 | 11/1940 | Mayo | 219/262 |
| 2,419,950 | 5/1947 | Johnson | 362/489 |
| 3,265,888 | 8/1966 | Adolphson, Jr. | 362/95 |
| 4,755,913 | 7/1988 | Sleveland | 362/95 |
| 5,030,811 | 7/1991 | von Gaisberg et al. | 362/489 |
| 5,093,554 | 3/1992 | von Gaisberg et al. | 219/267 |

*Primary Examiner*—Sandra O'Shea
*Assistant Examiner*—Ismael Negron

[57] ABSTRACT

An illuminated power outlet assembly for a motor vehicle having an insulator and an illumination device. The illumination device includes a light emitting diode and a resistor electrically coupled in series. The illumination device is positioned within a power outlet, specifically between the casing and the insulator, such that when the illumination device illuminates, the light passes through the insulator to light the power outlet.

6 Claims, 1 Drawing Sheet

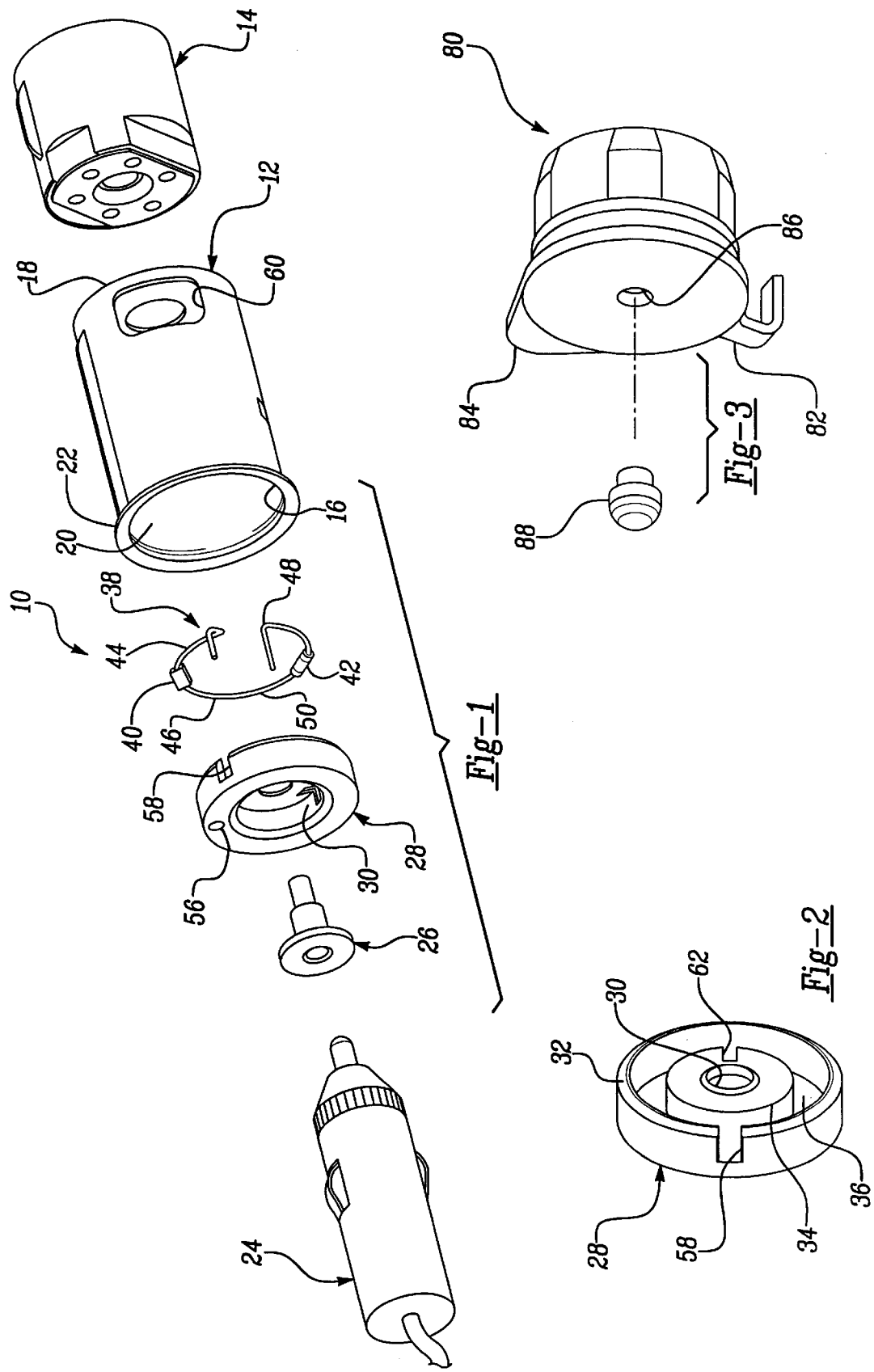

ILLUMINATED POWER OUTLET

FIELD OF THE INVENTION

The present invention relates to power outlets and, more particularly, to an illuminated power outlet assembly for a vehicle.

BACKGROUND OF THE INVENTION

Power outlets are standard equipment on most automobiles, trucks, boats, campers, and similar vehicles. These power outlets enable an operator to use the low voltage, direct-current power of the vehicle electrical system to power various electrical devices. These electrical devices may include mobile telephones, computers, televisions, and the like. To attach these electrical devices to the vehicle electrical system, a plug or connector, which is attached to the electrical device via a cord, is inserted into the power outlet to establish an electrical connection. It is common that these electrical devices are used and interchanged frequently during operation of the vehicle, during both day and night. Therefore, it is advantageous to illuminate the power outlet to aid the operator in locating the power outlet and inserting a plug therein during nighttime use.

In known designs, power outlets include a power terminal assembly mounted to a metallic casing or housing. The power terminal assembly is electrically coupled to the vehicle electrical system to provide means for providing low voltage, direct-current to an electrical device, such as a mobile phone or the like. Similarly, the metallic casing is electrically coupled to a ground element to ground the electrical circuit. The power outlet further includes a metallic connecting member, such as a rivet, extending through the base of the casing and electrically coupled with the power terminal assembly. An insulator is provided between the connecting member and the casing to electrically and thermally insulate the connecting member from the casing. In operation, the plug of the electrical device is inserted into the casing. The plug typically contacts the connecting member (+), which is connected to the positive side of an electrical circuit, at the end of the plug as well as contacts the metallic sidewall of the casing (−), thereby creating an electrical connection.

In an attempt to illuminate the power outlet to improve the operator's ability to locate the outlet during nighttime operation, a known design employs a light ring extending around the open end of the casing. This light ring is positioned on the external portion of the power outlet and is typically incorporated into the fascia panel of the vehicle. However, this design has various known shortcomings. Primarily, the light ring design draws a larger amount of current from the vehicle electrical system. This current generates heat in the light ring, which must be managed so as not to adversely effect surrounding parts. Moreover, this known design is complicated and expensive to fabricate. Lastly, the exterior positioning of the light ring may not afford adequate protection of the light ring from external impact.

Accordingly, there exists a need in the relevant art to provide an illuminated power outlet that overcomes the shortcomings of the prior art design. Further, there exists a need in the relevant art to provide an illuminated power outlet having an internal light source for improved lighting and protection of the light source.

SUMMARY OF THE INVENTION

In accordance with the broad teachings of this invention, an illuminated power outlet having an advantageous construction is provided.

According to the teachings of the present invention, an illuminated power outlet assembly is provided having a casing defining an internal volume and an open end for receiving a plug of an electrical device. The illuminated power outlet assembly further includes a power terminal assembly mounted to the casing. The power terminal assembly delivers low voltage, direct-current power to the electrical device. Lastly, the power outlet assembly includes illumination means for illuminating the internal volume of the housing. The illumination means is disposed within the internal volume of the housing to provide a simple and improved method of illuminating the power outlet. The illumination means being disposed within the internal volume of the housing further protects the illumination means from impact.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein:

FIG. 1 is an exploded perspective view of the illuminated power outlet assembly of the present invention;

FIG. 2 is a bottom perspective view of an insulator of the present invention having a light emitting diode and resister disposed therein; and FIG. 3 is an exploded perspective view of a cap member of the present invention having a lens centrally mounted therein.

DETAILED DESCRIPTION OF THE PREFERRED EMBODIMENTS

The following description of the preferred embodiment is merely exemplary in nature and is in no way intended to limit the invention, its application, or uses. For example, the illuminated power outlet assembly of the present invention may have utility in any application where a simple, convenient, and inexpensive method of lighting a power outlet is needed, such as vehicles, trucks, campers, boats, and the like.

Referring to the drawings, an illuminated power outlet assembly 10 is shown having a casing or housing 12 and a power terminal assembly 14 mounted to casing 12. Casing 12 is generally cylindrically shaped and includes at least one open end 16 and a base portion 18. Casing 12 and base portion 18 thereby define an internal volume 20. Casing 12 further includes a flange portion 22 radially extending around open end 16. Casing 12 is preferably made from an electrically conductive material, such as metal. Casing 12 is adapted to receive a plug or connector 24 of an electrical device (not shown), such as a mobile telephone, computer, television, or the like.

Power terminal assembly 14 is a conventional design and is electrically coupled to the positive (+) and negative (−) terminals of the vehicle electrical system (not shown) using known methods.

Illuminated power outlet assembly 10 further includes a connecting member 26 and an insulator 28. Preferably, connecting member 26 is a rivet made from an electrically conductive material, such as metal. Connecting member 26 is inserted through insulator 28 and casing 12 and into power terminal assembly 14, thereby retaining connecting member 26, insulator 28, casing 12, and power terminal assembly 14 as an integral unit. Insulator 28 is preferably disc-shaped and includes a countersunk central opening 30 for receiving connecting member 26. As best seen in FIG. 2, insulator 28 further includes a first concentric flange 32 extending around an outer periphery of disc-shaped insulator 28 and a second concentric flange 34 extending around an inner periphery of central opening 30. First concentric flange 32 and second concentric flange 34 define a concentric cavity 36 in insulator 28. Insulator 28 is preferably made of a non-conductive material. Insulator 28 and concentric cavity 36 will be described in detail below.

Referring back to FIG. 1, illuminated power outlet assembly 10 still further includes illumination means 38. Illumination means 38 preferably includes a light emitting diode 40 and a resistor 42 being electrically coupled in series. Specifically, light emitting diode 40 (LED) is a chip-style LED and includes a first lead 44 and a second lead 46 extending therefrom. Similarly, resistor 42 includes a first lead 48 and a second lead 50 extending therefrom. Second lead 46 of light emitting diode 40 is electrically coupled with second lead 50 of resistor 42 using appropriate means, such as soldering. Preferably, light emitting diode 40 is a 200 millicandella LED and resistor 42 is a 330 ohm resistor. Resistor 42 is provided to properly regulate the current flow through the light emitting diode 40. It should be appreciated that any resistor may be used that properly cooperates with the light emitting diode to provide an illumination circuit that operates within the preferred electrical thresholds.

Illumination means 38 is inserted and contained within concentric cavity 36 of insulator 28. Specifically, light-emitting diode 40 is positioned adjacent insulator 28 such that light-emitting diode 40 will emit light through a hole 56 formed in insulator 28. Alternatively, insulator 28 may be molded of a transparent or translucent material to enable insulator 28 to glow, thereby eliminating the need for hole 56 to be formed in insulator 28.

Illumination means 38 is positioned within concentric cavity 36 of insulator 28 such that first lead 44 of light-emitting diode 40 passes through a first slot 58 formed in first concentric flange 32. First slot 58 enables first lead 44 to contact an internal sidewall 60 of casing 12, thereby forming an electrical connection with the negative (−) side of the vehicle electrical system. Similarly, first lead 48 of resistor 42 passes through a second slot 62 formed in second concentric flange 34. Second slot 62 enables first lead 48 of resistor 42 to contact connecting member 26, thereby forming an electrical connection with the positive side (B+) of the vehicle electrical system. This arrangement enables the light emitting diode to function whenever power is supplied to the power outlet.

During assembly, illumination means 38 is disposed within concentric cavity 36 of insulator 28 such that first lead 44 of light emitting diode 40 extends through first slot 58 and first lead 48 of resistor 42 extends through second slot 62. Illumination means 38 and insulator 28 are then inserted as an assembly into internal volume 20 of casing 12. Illumination means 38 and insulator 28 are positioned within internal volume 20 such that illumination means 38 is between base portion 18 of casing 12 and insulator 28. First lead 44 of light emitting diode 40 will then contact internal sidewall 60 of casing 12 to establish an electrical connection therebetween. Connecting member 26 is then inserted into internal volume of casing 12 and received within countersunk central opening 30 of insulator 28. Connecting member 26 contacts first lead 48 of resistor 42 to establish an electrical connection therebetween. Connecting member 26 still further extends through casing 12 and into power terminal assembly 14 and completes the electrical connection between illumination means 38 and the vehicle electrical system.

Referring to FIG. 3, illuminated power outlet assembly 10 may also include a cap member 80 adapted to mate or otherwise connect with open end 16 of casing 12, thereby enclosing casing 12 when cap member 80 is in place. Preferably, cap member 80 includes a flexible hinge 82 and a finger support 84. Cap member 80 further includes a central opening 86 extending through cap member 80 for receiving a lens 88 therethrough. Preferably, lens 88 is made of a clear or colored plastic and is mounted to cap member 80 using suitable means, such as press-fit, glue, or the like. It is anticipated that lens 88 may be any size, shape, color, or material that is aesthetically desirable and provides acceptable luminance.

During operation, illuminated power outlet assembly 10 will produce a glow from inside the power outlet when cap member 80 is removed. This glow from within the power outlet assists the operator in locating the power outlet in the dark. When cap member 80 is mated with open end 16, light emitted within internal volume 20 will be transmitted through lens 88, thereby producing a glowing dot to assist the driver in locating the power outlet. The glowing dot further enables light being transmitted from the power outlet to be reduced if desired by the operator.

It should be appreciated that the illuminated power outlet of the present invention enables an operator to locate the power outlet safely and conveniently, without the aid of additional lighting, such as interior cabin lights. Furthermore, it should be appreciated that the illuminated power outlet of the present invention enables a power outlet to be simply and inexpensively illuminated while, simultaneously, protecting the lighting device from external damage. Still further, the illuminated power outlet of the present invention will not appreciably affect the current draw of the power outlet on the vehicle electrical system due to the low power consumption of light emitting diodes, nor will the illuminated power outlet of the present invention inhibit the function of the power outlet.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. An illuminated power outlet assembly for a motor vehicle, said illuminated power outlet assembly comprising:

a housing having an open end and a base portion;

a power terminal assembly mounted to said base portion of said housing;

an insulator having at least one flange, said insulator being disposed within said housing such that said at least one flange and said base portion of said housing forms a cavity;

an illumination device having a light emitting diode and a resistor electrically coupled in series, said illumination device being positioned within said cavity, said illumination device being electrically coupled to said power terminal assembly for illuminating light through said insulator; and a connecting member coupling said insulator and said illumination device to said housing, said connecting member further being electrically coupled to said power terminal assembly.

2. The illuminated power outlet assembly according to claim 1, further comprising:

a cap member for mating with said open end of said housing; and a lens disposed in said cap member.

3. The illuminated power outlet assembly according to claim 1 wherein said insulator includes a hole formed therethrough to facilitate the illumination of light through said insulator.

4. The illuminated power outlet assembly according to claim 1 wherein said insulator is made of a translucent material.

5. The illuminated power outlet assembly according to claim 1 wherein said connecting member is a rivet.

6. An illuminated power outlet assembly for a motor vehicle, said illuminated power outlet assembly comprising:

a housing having an open end and a generally closed portion;

a power terminal assembly mounted to said generally closed portion of said housing;

a translucent insulator having at least one flange, said insulator being disposed within said housing such that said at least one flange and said generally closed portion of said housing forms a cavity;

an illumination device having a light emitting diode and a resistor electrically coupled in series, said illumination device being positioned within said cavity, said illumination device being electrically coupled to said power terminal assembly for illuminating light through said insulator; and a rivet coupling said insulator and said illumination device to said housing, said rivet further being electrically coupled to said power terminal assembly.

* * * * *